United States Patent
Gries

[11] 3,883,578
[45] May 13, 1975

[54] RADIOPAQUE AGENTS

[75] Inventor: Heinz Gries, Berlin, Germany

[73] Assignee: Schering Aktiengesellschaft, Berlin and Bergkamen, Germany

[22] Filed: Sept. 29, 1971

[21] Appl. No.: 184,941

[30] Foreign Application Priority Data
Oct. 2, 1970 Germany............................ 2050217

[52] U.S. Cl......... 260/471 R; 260/239.3; 260/247.2; 260/293.79; 260/501.11; 260/518 A; 424/5
[51] Int. Cl........................................... C07c 101/54
[58] Field of Search........ 260/471 R, 518 A, 501.11

[56] References Cited
UNITED STATES PATENTS 3,476,802  11/1969  Holtermann et al............ 260/518 A
3,721,701  3/1973  Bernstein........................ 260/518 A Primary Examiner—Lorraine A. Weinberger
Assistant Examiner—L. A. Thaxton
Attorney, Agent, or Firm—Millen, Raptes & White

[57] ABSTRACT

Compounds of the formula

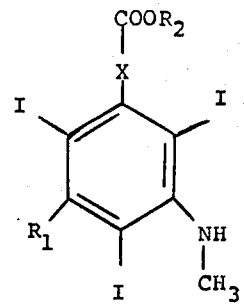

wherein $R_1$ is H, I, an amino or an amido group; $R_2$ is H or lower-alkyl and X is a C—C single bond, a bridging hydrocarbon group or a group of the formula

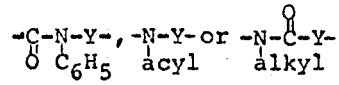

wherein Y is lower-hydrocarbon, are radiopaque agents useful, e.g., in myelography and bronchography.

27 Claims, No Drawings

RADIOPAQUE AGENTS

BACKGROUND OF THE INVENTION

This invention relates to novel radiopaque agents. It is well known from U.S. Pat. No. 2,705,726 that triiodated aminophenylalkanoic acids are useful as radiopaque agents for the gall bladder, for example the commercially available compound iopanoic acid. It is also known from the U.S. Pat. No. 3,119,859 that conversion of the nucleus bounded amino group to a dimethylaminoethylenamino group leads to useful radiopaque agents like sodium ipodate. The present invention concerns a process for the monomethylation of the nucleus bounded amino group and the compounds resulting therefrom, which were till now not available and are remarkably superior to the known radiopaque agents for the gall bladder.

The invention also concerns compounds useful for myelography, bronchography, urography and angiography. Furthermore the novel compounds are useful as intermediates for the production of other radiopaque agents, for example metrizoic acid (Brit. Pat. No. 973,881).

SUMMARY OF THE INVENTION

The compounds of this invention are monomethylamino compounds of the general Formula I

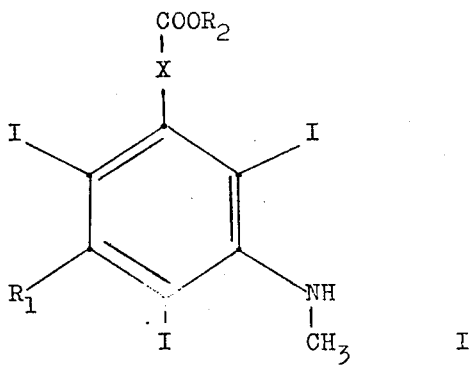

wherein $R_1$ is H, I, $-NHCH_3$, mono-lower-alkanoylamino, N-lower-alkyl-lower-alkanoylamino-, di-lower-alkanoyl-amino, lower-alkanoyl-aminomethyl,

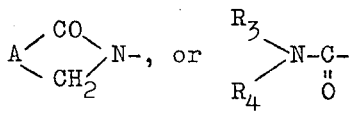

group, wherein $R_3$ and $R_4$, which can be identical or different, are H, lower-alkyl or hydroxy-lower-alkyl, or $R_3$ and $R_4$ together with the nitrogen atom form a heterocyclic ring containing 5-7 ring members and 0-1 additional hetero atom, and A is alkylene of 2 or 3 carbon atoms containing 0-1 oxygen atom in the chain; $R_2$ is H or lower-alkyl; and X is a C-C single bond, Y,

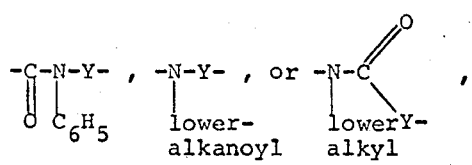

wherein Y, straight or branched-chain lower-alkylene, singly or as a mixture, including the physiologically acceptable salts thereof with bases.

DETAILED DISCUSSION

Of the compounds of this invention preferred are those meeting one or more of the following definitions:
a. those in the form of a sodium salt or a hydrochloride salt;
b. $R_1$ is H, $-CONHCH_3$, $-N(CH_3)COCH_3$, $-CH_2NHCOCH_3$, $NHCOCH_3$;
c. $R_2$ is H, $CH_3$ or $C_2H_5$;
d. X is a C—C single bond, lower-alkylene, preferably ethylene.

Lower-alkyl, lower-alkylene and lower-alkanoyl when used herein mean containing 1-6 combinations, e.g., methyl, ethyl, propyl, isopropyl, butyl; acetyl, propionyl, butyryl, valeryl and hexanoyl; and methylene, ethylene, propylene, 1,2-dimethylethylene, etc.

It will be apparent to those skilled in the art that when $R_1$ is other than H, I or $-NHCH_3$ and X is other than a carbon single bond, their exact nature is not critical to the utility of the compounds of Formula I as radiopaque agents and can thus be varied in a conventional manner without destroying their effectiveness. Thus, equivalents of the compounds of this invention wherein $R_1$ is a group bearing a lower-alkanoyl group are compounds otherwise corresponding structurally thereto and possessing the same activity where instead of a lower-alkanoyl group there is present the acyl group of another organic acid, e.g., a carboxylic acid containing up to 15 carbon atoms, especially lower (1-6) carbon atoms and intermediate (7-12) aliphatic carboxylic, preferably an alkanoic acid, which can be unsaturated, branched, polybasic, or substituted in the usual manner, for example by hydroxy or halogen atoms; a cycloaliphatic, aromatic and mixed aromatic-aliphatic (alkaryl and aralkyl) acid, which can likewise be substituted in the usual manner, examples of preferred such acids being acetic acid, propionic acid, caproic acid, enanthic acid, undecylic acid, oleic acid, trimethylacetic acid, dichloroacetic acid, cyclopentylpropionic acid, phenylpropionic acid, phenylacetic acid, phenoxyacetic acid, succinic acid, benzoic acid; others being acids containing 1-18, preferably 2-12 carbon atoms, including an aliphatic acid containing 1-18, preferably 1-6 carbon atoms, e.g., formic, butyric, isobutyric, α-ethylbutyric, valeric, isovaleric, α-ethylvaleric, 2-methylbutyric, 3-ethylbutyric, hexanoic, diethylacetic, triethylacetic, enanthic, octanoic, undecylic and palmitic acid; a cyclic acid, preferably a cycloaliphatic acid, containing, e.g., 5-18 carbon atoms, e.g., cyclopropylideneacetic, cyclobutylcarboxylic, cyclopentylcarboxylic, cyclopentylacetic, cyclohexylcarboxylic, cyclohexylacetic and β-cyclohexylpropionic acid; a carbocyclic aryl or alkaryl acid, e.g., containing 6-18 carbon atoms, and 1 to 5, preferably 1 or 2 rings, e.g., benzoic, 2-, 3-, or 4-methylbenzoic, 2,3-, 2,4-, 2,5-, 2,6-, 3,4-, and 3,5-dimethylbenzoic, ethylbenzoic, 2,3,6-trimethylbenzoic, and 3-methyl-α-naphthoic acid; an aralkyl acid, e.g., containing 7 to 18 carbon atoms, e.g., β-phenylpropionic, a polybasic acid, e.g., containing 2-18 carbon atoms and 1 to 5 hydroxy groups, e.g., glycolic, lactic, citric, tartaric, d-maleic, d-glyceric, and salicylic acid; the corresponding acids containing one, two or more of simple substituents, e.g., halo, alkoxy, acyloxy, etc., in the molecule, e.g., chloroacetic, fluoroacetic, trichloroacetic, trifluoroacetic, 2,3,4-trimethoxybenzoic, phenoxyacetic, α-naphthoxyacetic acid, etc.

The acyl group of such equivalent compounds can also be that of a sulfonic acid, e.g., an arylsulfonic, including benzenesulfonic, p-toluene-sulfonic, m,m'-dimethylbenzenesulfonic, o,o'-dimethylbenzenesulfonic, sym.-trimethylbenzenesulfonic, sym.-triethylbenzenesulfonic, m-ethylbenzenesulfonic, para-isopropylbenzenesulfonic, m-n-butylbenzenesulfonic acid, or an alkylsulfonic, e.g., methanesulfonic, ethanesulfonic, propanesulfonic, isopropanesulfonic, butanesulfonic, tert.-butanesulfonic, pentanesulfonic, isopentanesulfonic, hexanesulfonic, heptanesulfonic, octylsulfonic or heterocyclic sulfonic, e.g., α-pyridinesulfonic, α-pyranesulfonic, α-thiophensulfonic, α-furansulfonic, α-tetrahydrofuransulfonic, or other alkyl-, carbocyclic and heterocyclic aryl-, alkaryl-and aralkylsulfonic acid, preferably one containing 1–8 carbon atoms and 0–2, preferably 0–1, N, S or O heteroatoms, which are preferably ring carbon atoms in a heterocyclic ring.

Similarly, equivalents of the compounds of this invention are those otherwise corresponding to Formula I when X is

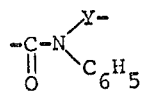

wherein the C₆H₅ group is substituted by another aryl group, e.g., tolyl, naphthyl; those otherwise corresponding to Formula I when X is

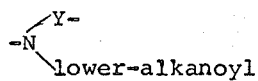

wherein the lower-alkanoyl group is replaced by the acyl radical of another organic acid, e.g., an acid named above; and those otherwise corresponding to Formula I when $R_1$ is a cyclic amido group wherein the cyclic amido group is substituted by another comparable amido group.

Suitable salts of physiologically acceptable bases are the metallic salts, e.g., the sodium, potassium, lithium, calcium and magnesium salts, and amine salts, preferably of weak amines, e.g., glucamine, N-methylglucamine, N,N-dimethylglucamine, ethanolamine, diethanolamine and morpholine, e.g., N-methylmorpholine salts.

The compounds of this invention are useful as radiopaque agents and also as novel intermediates for the preparation of radiopaque agents. Thus, compounds wherein X is other than a single bond exhibit, upon oral administration, excellent excretion via the gall bladder and acceptable toxicity. For example, in an excretion test on rats, in case of the mono-3-methylamino-2,4,6-triiodo-N-ethylanilide of succinic acid, 62% of the substance administered was excreted within 2 hours via the gall bladder as compared to 46% in case of the commercially available substance sodium ipodate. In the case of α-ethyl-β-(3-methylamino-2,4,6-triiodophenyl)propionic acid, the two-hour excretion value was 71%, compared to 57% in case of the commercially available compound iopanoic acid. A radiology test conducted on dogs demonstrated excellent contracting power for the novel compounds within a relatively short period of time, with good compatibility. These properties render the novel compounds of this invention especially suitable for "high-speed cholecystography" upon oral administration.

The esters of the compounds of this invention are particularly useful in the fields of myelography and bronchography.

Other compounds of Formula I wherein X is a C—C single bond are excreted in the urine after intravenous administration and thus are of importance for urography and angiography. The properties of these compounds can be still further improved by N-acetylation.

For example, by acetylating the 3-methylamino-5-acetyl-amino-2,4,6-triiodobenzoic acid of this invention, metrizoic acid is obtained, which is used in unrography and angiography.

In addition to relating to the novel compounds of general Formula I and the use thereof, the present invention also concerns the preparation thereof. The process for the production of these novel compounds is characterized in that compounds of the general Formula II

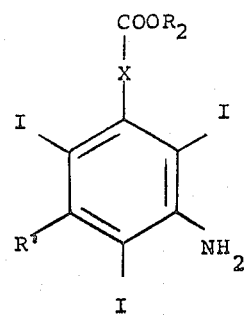

wherein R' represents a hydrogen or iodine atom, or an amino, monoacylamino, alkylacylamino, diacylamino, acylaminomethyl,

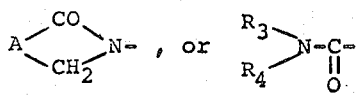

group, wherein A, $R_3$, and $R_4$ have the above indicated meanings, and $R_2$ and X have the same meanings as indicated above, are treated with a mixture of sulfuric acid and formaldehyde and, depending on the finally desired meaning of $R_2$, the thus-obtained compounds are optionally saponified, esterified, or converted into the salts.

The formaldehyde employed as the methylating agent can be utilized in the form of monomeric or polymeric formaldehyde, or as an aqueous formalin solution. The sulfuric acid is preferably used in the concentrated form. In order to obtain as complete a monomethylation as possible, it is advantageous to utilize the formaldehyde in an excess. The reaction can be conducted in a temperature range of about 30° C. to 80° C. After about 2–10 hours at 40°–60° C., the reaction is terminated. The final product is isolated in the customary manner, for example by precipitation with ice water and optionally by extraction with a suitable solvent.

The customary methods for the direct methylation of a primary amino group generally go beyond the monomethyl stage. In German Published Application OS 1,924,249, the monomethylation of nitroanilines with formaldehyde and sulfuric acid is described, but this published procedure relates to certain specific compounds operable in the process.

It is surprising that the amino group, which, due to the steric and electronic conditions in the 2,4,6- triiodophenyl compounds exhibits a substantially different character than in non-iodated anilines and thus cannot be titrated, for example, with acids, reacts in exactly the same manner as in the case of nitroanilines. It is also surprising that the sensitive starting poly-iodo compounds of the present invention can be subjected to such drastic reaction conditions without decomposition.

The novel monomethylamino compounds of this invention can be administered in the forms customarily employed in pharmaceuticals in admixture with a pharmaceutically acceptable carrier. For oral administration, especially suitable are tablets, dragees, capsules, pills, suspensions and solutions. Suitable excipients for tablets are, for example, lactose, amylose, talc, gelatin, magnesium stearate, etc. The compounds of this invention are formulated so as to provide, for example, 100 to 1000 mg, preferably 400 to 750 mg, of the effective agent in admixture with 0.1 to 1.0 mg of a pharmacologically inert excipient, i.c. a pharmaceutically acceptable carrier, per unit dosage, e.g., per tablet.

For intravenous administration the soluble salts of this invention are preferably used in aqueous solution where by the concentration is preferably between about 30 % by volume and about 60 % by volume. Other novel compounds of this invention, possessing only a limited solubility in water have proved to be especially suitable in the form of aqueous emulsions and suspensions whereby the amounts of effective agent must be at least 15 % by volume and may even exceed about 60 % by volume. The dosage range is like that for the oral administration.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

51.6 g. of 3-amino-2,4,6-triiodobenzoic acid is introduced at 50° C. into 200 ml. of concentrated sulfuric acid; this mixture is mixed dropwise under slight cooling and within 30 minutes, at an internal temperature of 50°–55° C., with 100 ml. of a 38% by weight aqueous formaldehyde solution. The reaction mixture is maintained at 50° C. for 6 hours and then allowed to cool off.

Thereafter, the mixture is poured into ice water (3 l.) and the thus-formed precipitate is extracted twice with respectively 300 ml. of ethyl acetate. The ethyl acetate solution is then washed twice with respectively 200 ml. of water, dried over sodium sulfate, and concentrated into a solid residue. For purposes of purification, the crude product (51 g.) is suspended in 500 ml. of water, dissolved with concentrated ammonia, treated with active carbon nd kieselgur, brought to a pH of 4 with concentrated sulfuric acid, and again treated with carbon. Thereafter, a pH of 1 up to maximally 1.5 is set by the dropwise addition of concentrated sulfuric acid. The mixture is agitated for 2 hours in an ice bath, the precipitate is vacuum-filtered, and then washed with water and dried at 50° C.

Yield: 45 g. = 85% of theory of 3-methylamino-2,4,6-triiodobenzoic acid, m.p. 167°–168° C. (under decomposition).

EXAMPLE 2

A solution of 5.8 g. of 3-amino-5-methylaminocarbonyl-2,4,6-triiodobenzoic acid in 20 ml. of concentrated sulfuric acid is mixed with 4 g. of trioxane at 50° C. After heating for 4 hours, the reaction mixture is worked up as described in Example 1, thus obtaining 3-methylamino-5-methylaminocarbonyl-2,4,6-triiodobenzoic acid as the sulfuric acid salt, m.p. from 225° C. (under decomposition), in satisfactory yields.

EXAMPLE 3

At 50° C., 117.2 g. of 3-amino-5-N-methylacetylamino-2,4,6-triiodobenzoic acid is dissolved in 400 ml. of concentrated sulfuric acid. Under slight cooling, 200 ml. of a 38% by weight aqueous formaldehyde solution is added dropwise thereto at 50°–55° C. The mixture is maintained at 50° C. for 8 hours, allowed to stand overnight at room temperature, and then precipitated into 6 l. of ice water. After stirring for one hour in the ice bath, the precipitate is vacuum-filtered and dissolved in 2 l. of ammonia. After the addition of active carbon, the mixture is agitated for 2 hours at room temperature, filtered, adjusted to a pH of 4, and again treated with active carbon. After filtration, the solution is brought to a pH of 1 by the addition of semiconcentrated sulfuric acid. After agitating for 2 hours in an ice bath, the precipitate is vacuum-filtered, washed with water, and dried at 50° C. Yield: 94 g. = 78% of theory of 3-methylamino-5-N-methylacetylamino-2,4,6-triiodobenzoic acid, m.p. 223–225° C. (under decomposition).

Analogously, from 3-amino-5-acetylaminomethyl-2,4,6-triiodobenzoic acid, 85% of theory of 3-methylamino-5-acetylaminomethyl-2,4,6-triiodobenzoic acid is obtained, m.p. 204°–205° C. (under decomposition). From a hydrochloric acid solution, a hydrochloride is crystallized, m.p. 145°–147° C.

EXAMPLE 4

Analogously to Example 1, 108 g. of β-(3-amino-2,4,6-triiodophenyl) propionic acid is reacted with 400 ml. of concentrated sulfuric acid and 200 ml. of a 38% by weight aqueous formaldehyde solution. The reaction mixture is poured, after cooling, into 5 l. of ice water, agitated for 2 hours, and the precipitate is vacuum-filtered and washed with water. The dried crude product (103 g., m.p. from 141° C.) is dissolved in 200 ml. of water by the addition of 5N sodium hydroxide solution up to a pH of 11. By the admixture of 200 ml. of acetone, a preliminary precipitation is effected. The filtrate is stirred together with carbon, again filtered, and then poured into 2 l. of ice-cooled acetone. After seeveral hours of agitation, the precipitate is vacuum-filtered. Yield: 97 g. = 84% of theory of the sodium salt of β-(3-methylamino-2,4,6-triiodophenyl)propionic acid, m.p. 285° C. (under decomposition).

When acidifying an aqueous solution of the sodium salt to a pH of 3–4, the β-(3-methylamino-2,4,6-triiodophenyl)-propionic acid is precipitated, m.p. 193°–195° C. (under decomposition). The corresponding hydrochloride melts at 176–177° C. (under decomposition).

By esterifying β-(3-methylamino-2,4,6-triiodophenyl)-propionic acid with dimethyl sulfate, the methyl ester of β-(3-methylamino-2,4,6-triiodophenyl)propionic acid is obtained, m.p. 79°–81° C.

EXAMPLE 5

63.6 g. of the sodium salt of succinic acid mono-3-amino-2,4,6-triiodo-N-ethylanilide is dissolved at 50° C. in 200 ml. of concentrated sulfuric acid. At this temperature, under slight cooling, 100 ml. of a 38% by weight formaldehyde solution is admixed dropwise, and the reaction mixture is maintained for another 4 hours at 50° C. After allowing the mixture to stand overnight at room temperature, it is poured into 3 l. of ice water, and the reaction product is extracted with methylene chloride. After drying the solution over sodium sulfate, the extractant is removed by evaporation and the residue is treated on a steam bath for 1 hour with a mixture of 400 ml. of dioxane, 400 ml. of water, and 80 ml. of 2N sodium hydroxide solution. After the addition of 800 ml. of water, the clear solution is concentrated under vacuum to one-half its quantity; in this connection, the pH is not to be above 10.5. The thus-concentrated solution, after treatment with 5 g. of active carbon, is brought to a pH of 1–2 by the addition of concentrated hydrochloric acid, and the precipitate, which gradually solidifies into a crystalline slurry, is recrystallized from 200 ml. of ethyl acetate. Yield: 52 g. = 83% of theory of succinic acid mono-3-methylamino-2,4,6-triiodo-N-ethylanilide, m.p. 133°–135° C.

Analogously, from α-ethyl-β-(3-amino-2,4,6-triiodophenyl)propionic acid, α-ethyl-β-(3-methylamino-2,4,6-triiodophenyl)propionic acid is obtained, m.p. 133° C. (from methanol).

EXAMPLE 6

Analogously to Example 1, 30 g. of N-acetyl-N-(3-amino-2,4,6-triiodophenyl)-2-methyl-β-alanine in 98 ml. of concentrated sulfuric acid is reacted with 49 ml. of a 38% by weight aqueous formaldehyde solution. The reaction mixture is poured into 1.5 l. of ice water after cooling, agitated for another 2 hours, the precipitate is vacuum-filtered and washed with water. In order to saponify partially formed methyl ester, the moist substance is dissolved, under slight heating, in 145 ml. of dioxane. After the addition of 50 ml. of water, the mixture is heated to 90° C. and 8 ml. of a 35% by weight sodium hydroxide solution is gradually added dropwise, so that the pH of the solution ranges between 10.5 and 11. The end of the reaction is recognized by the fact that, upon a strong dilution with water, no trubidity occurred in the solution. Then, the mixture is once again mixed with 200 ml. of water and the dioxane is removed by distillation. The solution, cooled to room temperature, is treated with 3 g. of active carbon and, after filtration, brought to a pH of 4.2 by the addition of 12 ml. of glacial acetic acid. The thus-produced precipitate is vacuum-filtered, washed with water, and dried at 50° C., thus obtaining 20 g. = 63.5% of theory of N-acetyl-N-(3-methylamino-2,4,6-triiodophenyl)-2-methyl-β-alanine, m.p. 172°–174° C. (under decomposition).

EXAMPLE 7

Analogously to Example 1, 45 g. of 3-amino-5-methylaminocarbonyl-2,4,6-triiodobenzoic acid in 245 ml. of concentrated sulfuric acid is reacted with 125 ml. of a 38% by weight aqueous formaldehyde solution. The reaction mixture, after cooling to room temperature, is poured into 3 l. of ice water, agitated for several hours in an ice bath, and the thus-produced precipitate is vacuum-filtered and washed with water. Then, the moist crude product is suspended in 1 l. of water, dissolved by the addition of dilute ammonia, and, after treatment with 5 g. of active carbon, the purified reaction product is precipitated by the addition of semiconcentrated sulfuric acid. After agitating the mixture several hours in an ice bath, the precipitate is vacuum-filtered, washed with water, and dried at 50° C. Yield: 32 g. = 70% of theory of 3-methylamino-5-methylaminocarbonyl-2,4,6-triiodobenzoic acid, m.p. 200°–202° C. (under decomposition).

EXAMPLE 8

A solution of 1 g. of 3-amino-5-acetylamino-2,4,6-triiodobenzoic acid in 40 ml. of concentrated sulfuric acid is mixed dropwise, under ice cooling and agitation, with 20 ml. of b "% formalin solution. The solution is stirred for 6 hours at room temperature and then poured into 600 ml. of ice water. After allowing the mixture to stand overnight, the brown precipitate (9.1 g.) is vacuum-filtered and purified, in the form of an ammonia salt solution, by chromatography over a column with aluminum oxide.

Yield: 4.2 g. = 33% of theory of 3-methylamino-5-acetylamino-2,4,6-triiodobenzoic acid, m.p. from 170° C. (under decomposition).

EXAMPLE 9

A solution of 10.6 g. of 3-amino-2,4,6-triiodobenzoic acid methyl ester in 40 ml. of concentrated sulfuric acid is reacted, analogously to Example 1, with formalin solution for 4 hours at 50° C. and then poured into ice water. The crude ester is taken up in methylene chloride, washed with a methylglucamine solution and water, evaporated to dryness, and recrystallized from methanol. Yield in 3-methylamino-2,4,6-triiodobenzoic acid methyl ester: 9.75 g. = 90% of theory, m.p. 75°–77° C.

EXAMPLE 10

A mixture of 5.3 g. of 3-methylamino-2,4,6-triiodobenzoic acid, 0.64 g. of sodium carbonate, and 1.6 ml. of diethyl sulfate in 6 ml. of dimethylformamide is heated under agitation to 90° C. for 30 minutes. After cooling, the solution is stirred into 100 ml. of water and decanted off from the thus-produced precipitate. The crude ester is taken up in 60 ml. of methylene chloride, washed with 10% strength methylglucamine solution and water, evaporated to dryness, and recrystallized from ethanol.

Yield: 5.0 g. = 90% of theory of the ethyl ester of 3-methylamino-2,4,6-triiodobenzoic acid, m.p. 87°–89° C.

EXAMPLE 11

1.25 kg. of succinic acid mono-3-methylamino-2,4,6-triiodo-N-ethylanilide is formed into a paste in a masticator with 0.5 l. of starch paste containing 25 g. of corn starch. The moist composition is granulated in the usual manner and dried under vacuum. The finished granules are then mixed with 125 g. of corn starch and 6 g. of magnesium stearate and compressed to tablets having a content of effective agent of 500 mg.

EXAMPLE 12

750 g. of α-ethyl-β-(3-methylamino-2,4,6-triiodophenyl)propionic acid is filled into mating capsules made of gelatin. In this way, 1000 gelatin capsules are obtained containing 750 mg. of effective agent per capsule. For the mechanical capsule manufacture, the opaquing substance is processed with 40 % paraffin oil into a fluid paste.

EXAMPLE 13

The granules obtained according to Example 11 with succinic acid mono-3-methylamino-2,4,6-triiodo-N-ethylanilide as the opaquing substance are made into dragees by the application of 20 % of their own weight of sugar syrup in a dragee-producing vessel and thereafter waxed.

EXAMPLE 14

Following the procedure of Example 1, N,N'-dimethyl-3,5-diamino-2,4,6-triiodobenzoic acid is produced from 3,5-diamino-2,4,6-triiodo-benzoic acid.

EXAMPLE 15

Following the procedure of Example 1, N-(3-methylamino-2,4,6-triiodobenzoyl)-N-phenyl-β-alanine is produced from N-(3-amino-2,4,6-triiodobenzoyl)-N-phenyl-β-alanine.

EXAMPLE 16

Following the procedure of Example 1,3-methylamino-5-(N-butyrolacetamyl)-2,4,6-triiodobenzoic acid is produced from 3-amino-5-(N-butyrolactamyl)-2,4,6-triiodobenzoic acid.

The preceding examples can be rejected with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Compounds of the formula

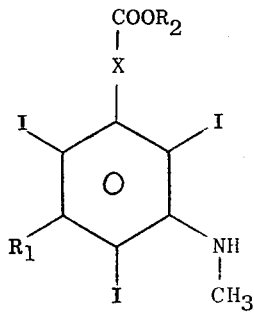

wherein $R_1$ is H, I, —NHCH$_3$, mono-lower-alkanoyl-amino, N-lower alkyl-lower-alkanoyl-amino, di-lower-alkanoyl-amino, lower-alkanoyl-aminomethyl or carbamoyl of the formula

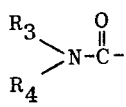

wherein $R_3$ and $R_4$ are each hydrogen, lower alkyl or hydroxy-lower-alkyl; $R_2$ is H or lower alkyl; and X is a C—C single bond or lower alkylene; and physiologically acceptable salts thereof.

2. A compound according to claim 1, wherein X is ethylene.

3. A compound according to claim 1, in the form of a sodium salt or a hydrochloride salt.

4. A compound according to claim 1, wherein $R_1$ is H, —NHCH$_3$, mono-lower-alkanoyl-amino, N-lower-alkyl-lower-alkanoyl-amino, di-lower alkanoyl-amino or lower-alkanoyl-aminomethyl.

5. A compound accordinng to claim 1, wherein $R_1$ is H, —CONHCH$_3$, —N(CH$_3$)COCH$_3$, —CH$_2$NHCOCH$_3$ or —NHCOCH$_3$.

6. A compound according to claim 1, wherein $R_2$ is H, CH$_3$ or C$_2$H$_5$.

7. A compound according to claim 5, wherein $R_2$ is H, CH$_3$ or C$_2$H$_5$.

8. A compound of claim 1, 3-methylamino-2,4,6-triiodobenzoic acid.

9. A compound of claim 1, 3-methylamino-5-methylaminocarbonyl-2,4,6-triiodobenzoic acid.

10. A compound of claim 1, 3-methylamino-5-N-methylacetylamino-2,4,6-triiodobenzoic acid.

11. A compound of claim 1, 3-methylamino-5-acetylaminomethyl-2,4,6-triiodobenzoic acid.

12. A compound of claim 1, the sodium salt of β-(3-methylamino-2,4,6-triiodophenyl)propionic acid.

13. A compound of claim 1, β-(3-methylamino-2,4,6-triiodophenyl)propionic acid.

14. A compound of claim 1, β-(3-methylamino-2,4,6-triiodophenyl)propionic acid hydrochloride.

15. A compound of claim 1, the methyl ester of β-(3-methylamino-2,4,6-triiodophenyl)propionic acid.

16. A compound of claim 1, α-ethyl-β-(3-methylamino-2,4,6-triiodophenyl)propionic acid.

17. A compound of claim 1, N,N'-dimethyl-3,5-diamino-2,4,6-triiodobenzoic acid.

18. A compound of claim 1, 3-methylamino-5-acetylamino-2,4,6-triiodobenzoic acid.

19. A compound of claim 1, the methyl ester of 3-methylamino-2,4,6-tyriiodobenzoic acid.

20. A compound of claim 1, the ethyl ester of 3-methylamino-2,4,6-triiodobenzoic acid.

21. A process for preparing a compound according to claim 1, which comprises reacting a compound of the formula

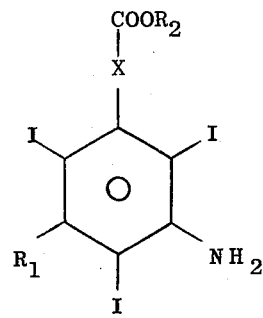

wherein $R_1$, $R_2$ and X have the above-indicated values, with 5–10 moles of formaldehyde in sulfuric acid at a temperature of about 30°–80°C. to monomethylate the 3-amino group.

22. A process according to claim 21, wherein $R_2$ is lower alkyl, further comprising saponifying the resultant ester to form a corresponding acid salt.

23. A process according to claim 21, wherein $R_2$ is hydrogen, further comprising esterifying the carboxyl group to form a lower alkyl ester thereof.

24. A process according to claim 21, further comprising converting the resultant product into a pharmaceutically acceptable acid addition salt thereof.

25. A process according to claim 21, wherein $R_1$ is H, —NHCH$_3$, mono-lower-alkanoyl-amino, N-lower-alkyl-lower-alkanoyl-amino, di-lower-alkanoyl-amino or lower-alkanoyl-aminomethyl.

26. A process according to claim 21, wherein $R_1$ is H, CONHCH$_3$ —N(CH$_3$) COCH$_3$, —CH$_2$NHCOCH$_3$ or —NHCOCH$_3$.

27. A process according to claim 26, wherein X is ethylene.

* * * * *